United States Patent
Sugiyama et al.

(10) Patent No.: US 7,667,455 B2
(45) Date of Patent: Feb. 23, 2010

(54) ANNULAR MAGNETIC ENCODER HAVING POLE ARRANGEMENT THAT SPECIFIES ROTATIONAL ANGLE

(75) Inventors: Yasushi Sugiyama, Fujisawa (JP); Hiroyuki Nikamoto, Fujisawa (JP); Takashi Ota, Fujisawa (JP); Junichi Wakabayashi, Takahashi (JP)

(73) Assignee: NOK Corporation, Tokyo (JP)

( * ) Notice: Subject to any disclaimer, the term of this patent is extended or adjusted under 35 U.S.C. 154(b) by 336 days.

(21) Appl. No.: 11/632,107

(22) PCT Filed: Jul. 12, 2005

(86) PCT No.: PCT/JP2005/012863
§ 371 (c)(1),
(2), (4) Date: Jan. 10, 2007

(87) PCT Pub. No.: WO2006/006605
PCT Pub. Date: Jan. 19, 2006

(65) Prior Publication Data
US 2008/0061771 A1    Mar. 13, 2008

(30) Foreign Application Priority Data

| | | |
|---|---|---|
| Jul. 12, 2004 | (JP) | 2004-204894 |
| Jul. 12, 2004 | (JP) | 2004-204895 |
| Nov. 4, 2004 | (JP) | 2004-320400 |

(51) Int. Cl.
   *G01B 7/30* (2006.01)
(52) U.S. Cl. .................................. 324/207.25
(58) Field of Classification Search ........... None
   See application file for complete search history.

(56) References Cited

U.S. PATENT DOCUMENTS

| | | | | |
|---|---|---|---|---|
| 4,746,862 A | * | 5/1988 | Ueki | 324/207.25 |
| 4,766,376 A | * | 8/1988 | Takahashi et al. | 324/207.21 |
| 4,785,241 A | * | 11/1988 | Abiko et al. | 324/207.21 |
| 4,786,870 A | * | 11/1988 | Kawamata et al. | 324/207.21 |
| 5,461,311 A | * | 10/1995 | Nakazato et al. | 324/207.24 |
| 6,054,851 A | * | 4/2000 | Masreliez et al. | 324/207.17 |
| 6,246,233 B1 | * | 6/2001 | Griffen et al. | 324/207.21 |
| 6,300,758 B1 | | 10/2001 | Griffen et al. | |

FOREIGN PATENT DOCUMENTS

EP    00 99 797    2/1984

(Continued)

OTHER PUBLICATIONS

International Search Report (in English) for PCT/JP2005/012863, ISA/JP, mailed Aug. 30, 2005.

*Primary Examiner*—Jay M Patidar
(74) *Attorney, Agent, or Firm*—Harness, Dickey & Pierce, P.L.C.

(57) ABSTRACT

An annular magnetic encoder is provided in which a plurality of S magnetic poles and N magnetic poles are alternately arranged in an arrangement pattern. The arrangement pattern comprises: a plurality of index parts provided in a circumferential direction at fixed intervals; a plurality of standard pitch parts provided between the index parts; and a plurality of specific pitch parts provided in all of the standard pitch parts or in the standard pitch parts other than one standard pitch part, where the specific pitch parts are arranged in different positions within each of the standard pitch parts.

3 Claims, 9 Drawing Sheets

FOREIGN PATENT DOCUMENTS

| | | |
|---|---:|---|
| EP | 99797 A | 2/1984 |
| JP | 59-501227 A | 7/1984 |
| JP | 59-501227 T | 12/1984 |
| JP | 63-33603 A | 2/1988 |
| JP | 6-18283 A | 1/1994 |
| JP | 6-18547 A | 1/1994 |
| JP | 7-74020 A | 3/1995 |
| JP | 9-49453 A | 2/1997 |
| JP | 11-229948 A | 8/1999 |
| JP | 2000-18971 A | 1/2000 |
| WO | 84/00261 A | 1/1984 |

* cited by examiner

ANNULAR MAGNETIC ENCODER HAVING POLE ARRANGEMENT THAT SPECIFIES ROTATIONAL ANGLE

CROSS-REFERENCE TO RELATED APPLICATIONS

This application is a National Stage of International Application No. PCT/JP2005/012863, filed Jul. 12, 2005. This application claims the benefit of Japanese patent application 2004-204894 filed Jul. 12, 2004; 2004-204895 filed Jul. 12, 2004; and 2004-320400 filed Nov. 4, 2004. The disclosures of the above applications are incorporated herein by reference in their entirety.

FIELD

The present invention relates to a magnetic encoder used for detecting rotation of a rotating member mounted in an automobile or a home electrical appliance, for example.

BACKGROUND

Figure 13:
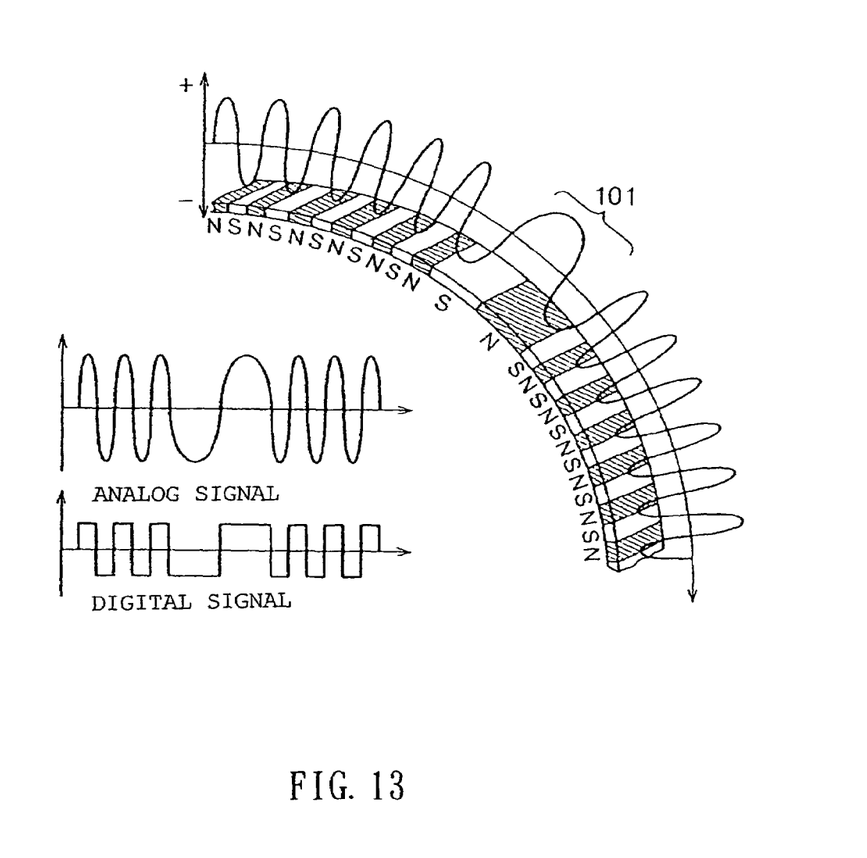
FIG. 13 is a perspective view of a part of a magnetic encoder in a conventional embodiment.

A magnetic encoder is used, for example, for detecting a crank angle of an automobile. FIG. 13 shows an example of a conventional magnetic encoder. The magnetic encoder comprises a signal output part 101 used as a position standard. The signal output part 101 is arranged so that the width in a circumferential direction of a magnetic pole would be twice as long as that of a magnetic pole on another part in the circumferential direction. The width of all of magnetic poles in an area other than the signal output part 101 in the circumferential direction is arranged to be fixed (to be a half of the width in the circumferential direction of a magnetic pole in the signal output part 101). A rotational angle based on the signal output part 101 (0°) is detected in the area.

Further, there is also a technique disclosed in JP-A-7-74020. In the technique, the signal output part used as a position standard projects in a convex shape, while a predetermined arrangement pattern of magnetic poles is continued in the other parts. A rotational angle based on the signal output part is detected in the arrangement pattern part of magnetic poles.

In such a magnetic encoder, in order to detect a signal output part used as a position standard, the signal output part should pass through a part for detection by means of a sensor. Accordingly, the magnetic encoder is sometimes rotated at the maximum angle of nearly 360° for the purpose of detecting the signal output part.

Recently, an idling stop has been encouraged from an environmental point of view. Fuel is jetted to all cylinders, however, simultaneously with restarting an engine. The fuel jet to all cylinders is not preferable from an environmental point of view. In order to solve the problem, it is required to position a cylinder on the basis of a crank angle, a cam angle, or the like just after starting an engine to jet fuel only to a cylinder necessary to be fueled.

In the conventional case, however, a magnetic encoder should be rotated at the maximum angle of about 360° for the purpose of detecting the signal output part. Accordingly, a rotational angle cannot be specified with little rotation in a short time.

JP-A-9-49453 and JP-A-11-229948 disclose techniques in which the rotational angle can be specified in a short time. In the case of these techniques, however, structures are complicated and the number of components is large, and therefore, further improvement is desired.

An object of the invention, therefore, is to provide a magnetic encoder capable of specifying a rotational angle with little rotation.

SUMMARY

In order to solve the above-mentioned problem, the invention is achieved in the following modes.

That is to say, a magnetic encoder of the invention is an annular magnetic encoder in which a plurality of S poles and N poles, the S poles and the N poles being magnetic poles, are alternately arranged. The magnetic encoder has a structure in which a change in width of the magnetic poles in a rotational direction according to a rotational angle allows the rotational angle to be specified.

In accordance with the invention, a difference in width of magnetic poles in a rotational direction allows a rotational angle to be specified, so that little rotation can specify a rotational angle.

Further, the magnetic encoder of the invention is an annular magnetic encoder in which a plurality of S poles and N poles, the S poles and the N poles being magnetic poles, are alternately arranged. The arrangement pattern of the magnetic poles comprises a plurality of index parts provided in a circumferential direction at fixed intervals. A plurality of standard pitch parts respectively are provided between the index parts, and a plurality of specific pitch parts respectively are provided in all of the standard pitch parts or in the standard pitch parts other than one standard pitch part. The specific pitch parts are provided in different modes for the respective standard pitch parts. The index part, the standard pitch part, and the specific pitch part are different in width of the magnetic pole in the circumferential direction.

In accordance with the invention, the arrangement pattern of the magnetic poles in a section divided by the index part is different for every section. That is to say, the standard pitch part is provided between all index parts while the specific pitch part is different in mode (including the case with no specific pitch part) in every section. This allows a section to be specified on the basis of the specific pitch part. Accordingly, little rotation can specify a rotational angle.

As an example of providing the specific pitch part in a mode different for every standard pitch part, considered can be arranging a position for providing the specific pitch part to be different from that of each standard pitch part or arranging the number of the magnetic poles in the specific pitch part to be different from that of the magnetic poles in each standard pitch part.

Moreover, a magnetic encoder of the invention is an annular magnetic encoder in which a plurality of S poles and N poles, the S poles and the N poles being magnetic poles, are alternately arranged. The magnetic encoder comprises a first track in which a plurality of arrangement patterns respectively having the same arrangement of the magnetic poles are arranged, and a second track in which a plurality of arrangement patterns respectively having different arrangement of the magnetic poles are arranged.

In the above, it is preferable to detect a rotational angle on the basis of comparison between the arrangement patterns on the first track and the arrangement patterns on the second track.

Further, the arrangement patterns of the magnetic poles on the second track are preferably different in magnetic pole number included in the respective arrangement patterns.

Moreover, it is preferable that the arrangement patterns of the magnetic poles on the first track are same in width of the magnetic pole in a circumferential direction and the magnetic poles same in width in the circumferential direction are provided on the whole circumference of the track.

In addition, it is preferable that the arrangement pattern of the magnetic poles on the first track comprises an index part provided at the head thereof and a standard pitch part equal in number of the magnetic poles, the standard pitch part being provided subsequently to the index part and that the index part and the standard pitch part are different in width of the magnetic poles in a circumferential direction.

The above-mentioned respective structures can be assembled for use as much as possible.

In accordance with the invention, little rotation allows a rotational angle to be specified.

DRAWINGS

The drawings described herein are for illustration purposes only and are not intended to limit the scope of the present disclosure in any way.

DETAILED DESCRIPTION

Best modes for carrying out the invention will be exemplified in detail hereinafter with reference to the drawings. The dimension, material, shape, relative arrangement and such of components described in the embodiments, however, do not limit the scope of the invention unless there is especially specific description provided.

Figure 1:
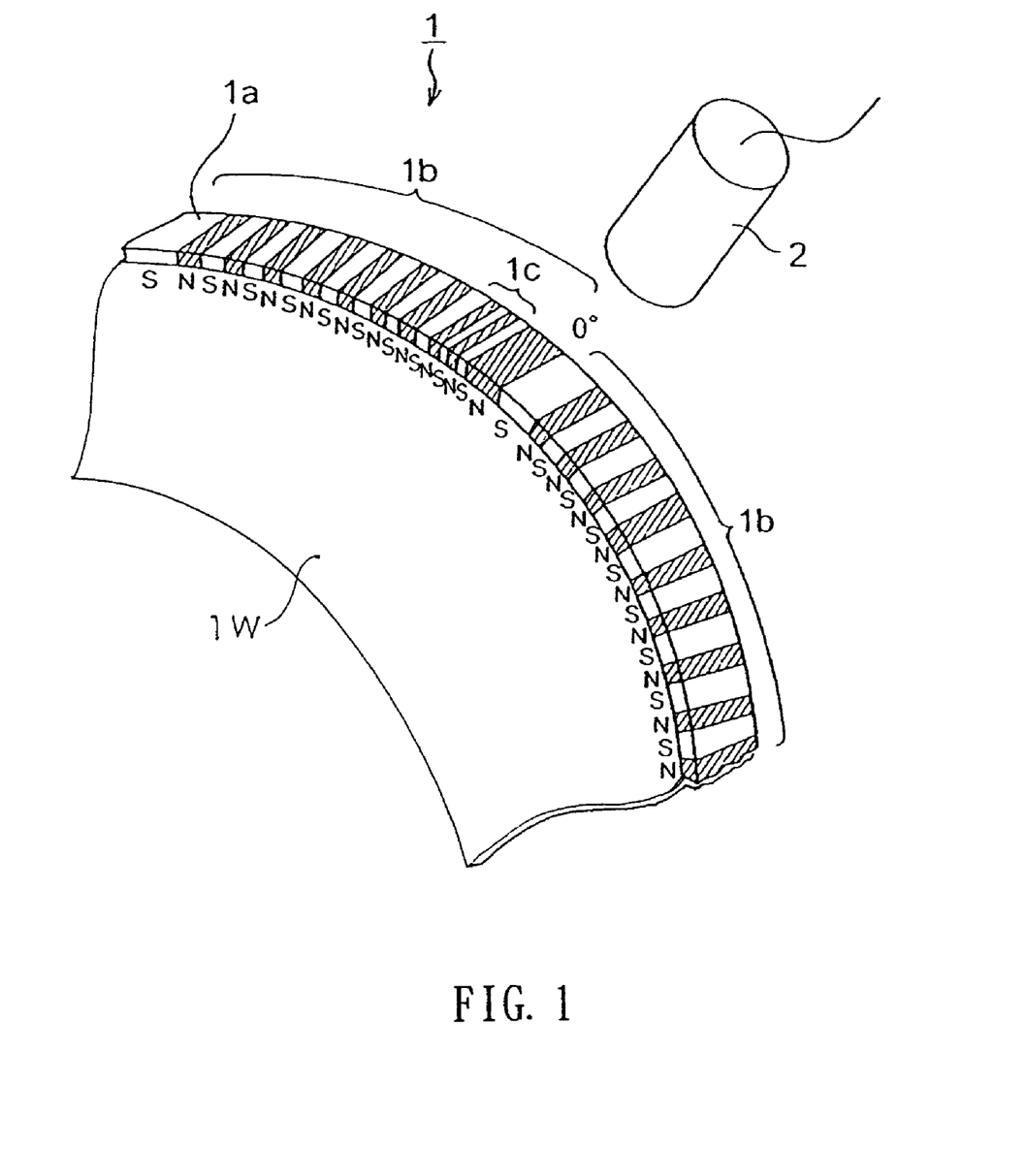
FIG. 1 is a perspective view of a part of a magnetic encoder of the invention.

FIG. 1 is a perspective view of a part of a magnetic encoder of the invention. A magnetic encoder 1 in FIG. 1 comprises a wheel 1w and a line of track 1a provided on the outer circumference of the wheel 1w. A detecting means 2 for detecting strength of a magnetic field is provided oppositely to a surface of the track 1a. The size of the magnetic encoder 1 can be properly selected in accordance with a rotation member to be fixed.

A magnetometric sensor is used for the detecting means 2. The magnetometric sensor is a sensor for detecting magnetic energy as a subject. A magnetic head to which an electromagnetic induction operation is applied, a differential transformer, a hall element using an operation for converting magnetic power into electricity and an MR element (magnetoresistance effect element) are specific examples of the magnetometric sensor.

The track 1a is formed from S poles and N poles, which are magnetic poles, alternately provided on the whole circumference. The magnetic poles located oppositely to the detecting means 2 (at a detecting position of the detecting means 2) are changed in polarity from N to S or from S to N when the track 1a rotates. The change of the magnetic field at that time is detected as a pulse. A rotational angle and an angle speed of the magnetic encoder 1 are calculated on the basis of the detected pulse number, pulse width and the like.

The track 1a is arranged so that locations (0°, 45°, 90°, 135°, 180°, 225°, 270°, 315°) obtained by dividing the magnetic encoder 1 of 0° to 360° into eight by the angle of 45° can be calculated.

Figure 2:
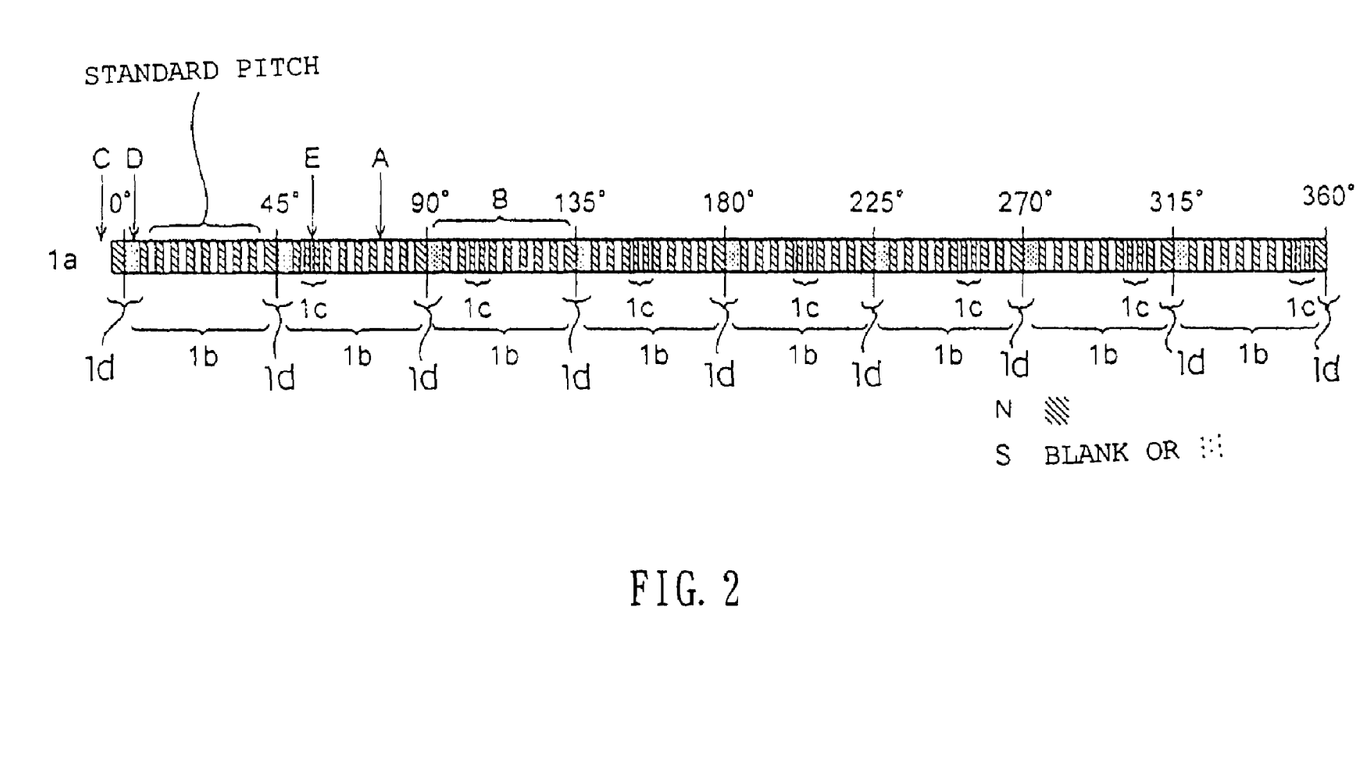
FIG. 2 illustrates arrangement patterns of magnetic poles of a magnetic encoder of the invention.

An arrangement pattern of the magnetic poles of the track 1a is arranged so that a predetermined pattern 1b is repeated at fixed intervals (intervals of 45°), as shown in FIG. 2. The predetermined pattern 1b comprises an index 1d (an index part), a standard pitch pattern (a standard pitch part) and a fine pitch pattern 1c (a specific pitch part) provided in the standard pitch pattern. However, there is only one predetermined pattern 1b comprising no fine pitch pattern 1c. The index 1d, the standard pitch pattern and the fine pitch pattern 1c are same in that the S poles and the N poles, which are a magnetic pole, are alternately provided, but different in width of the magnetic poles in the circumferential direction, respectively. The width of the magnetic poles in the circumferential direction becomes narrower in the order from the index 1d, the standard pitch pattern and the fine pitch patter 1c in the embodiment.

The index 1d is provided at the head (the left end in FIG. 2) of the predetermined pattern 1b. Accordingly, the indexes 1d are provided at the fixed intervals (intervals of 45°) on the whole circumference. The standard pitch patterns to be arranged at certain fixed pitches (standard pitches) are provided in an area other than the index 1d in the predetermined pattern 1b. Thus, the standard pitch patterns are respectively provided between the index 1d and the index 1d. The fine pitch patterns 1c are respectively provided in the respective standard pitch patterns other than one standard pitch pattern.

The predetermined patterns 1b are provided at positions in 0° to 45°, 45° to 90°, 90 to 135°, 135° to 180°, 180° to 225°, 225° to 270°, 270° to 315° and 315° to 360°, respectively. As described above, the predetermined pattern 1b is repeatedly provided at intervals of 45° on the whole circumference of the track 1a.

The fine pitch pattern 1c comprises two fine N poles and a fine S pole sandwiched therebetween. The fine pitch pattern 1c is not provided in the predetermined pattern 1b in 0° to 45°, as shown in FIG. 2. In the other predetermined patterns 1b, provided are the fine pitch patterns 1c so that the position in the predetermined pattern 1b would be gradually shifted rearward as the angle becomes large. That is to say, the fine pitch pattern 1c is arranged in a position different for every predetermined pattern 1b of the track 1a. The position of the fine pitch pattern 1c is thus arranged to correspond to the rotational angle in advance.

The magnetic field of the track 1a is detected by the detecting means 2 from the outside of the outer circumferential surface of the magnetic encoder 1 as shown in FIG. 1.

In the magnetic encoder 1 having such a structure, a position (0°, 45°, 90°, 135°, 180°, 225°, 270° or 315°) in the area obtained by dividing 0° to 360° by 45° within a rotation of 90° from any position can be specified.

For example, in the case of starting rotation from a point A in FIG. 2, position information of the fine pitch pattern 1c in the predetermined pattern 1b can be obtained in the area of the predetermined pattern 1b in B, which starts from obtaining a pulse of the first index 1d until obtaining a pulse of the second index 1d, on the basis of the pulse of the fine pitch pattern 1c. The position information contributes to specify which rotational angle the read predetermined pattern 1b corresponds to. In the above case, it can be seen that the predetermined pattern 1b corresponds to 90° to 135°. Accordingly, it can be specified that the position where a pulse of the second index is obtained is 135°.

As described above, it is detected whether the fine pitch pattern 1c exists or not in a section between the index 1d and the index 1d. If the fine pitch pattern 1c exists, it is specified the position of the fine pitch pattern 1c in the section. This allows the rotational angle of the magnetic encoder 1 to be discriminated by the angle of 45°. At that time, the rotational angle of the magnetic encoder 1, which is required for the purpose of specifying the rotational angle, is 45° to 90° necessary to measure a section between two indexes of the track 1a.

Therefore, in accordance with the magnetic encoder 1, little rotation allows the rotational angle to be specified. In the case of reverse rotation of the magnetic encoder 1, the reverse rotation can be discriminated since the order of reading the N poles and the S poles of the index 1d of the track 1a is changed, so that little rotation also allows the reverse rotation to be stopped.

In view of the above, the following advantage can be provided. In the case of a four-cylinder engine, for example, a crankshaft should be conventionally rotated at the maximum angle of 360° for the purpose of specifying a position of the cylinder. On the other hand, rotation within 90° of the crankshaft from the start of the engine allows the position of the cylinder to be specified. Accordingly, the fuel can be jetted only to the necessary cylinder, so that the unnecessary fuel jet can be reduced. This is effective from an environmental point of view.

Further, the magnetic encoder 1 is effective as a non-contact rotation control means. The magnetic encoder 1 can be also used for rotation control of an arm of a robot, for example.

Now, in the embodiment, the index 1d, the standard pitch pattern and the fine pitch pattern 1c in the predetermined pattern 1b divided into eight in one track 1a will be compared in pulse time width (duty). In the case that the angle speed changes in starting time, for example, the change may be considered to cause difficulty in discrimination of each of the above.

Even in such a case, however, setting a pitch width on the basis of a rising characteristic of the angle speed so that the size of each of the standard pitch pattern and the fine pitch pattern 1c would be clear or comparing the preceding and subsequence pulse width allows an absolute position to be detected.

Figure 3:
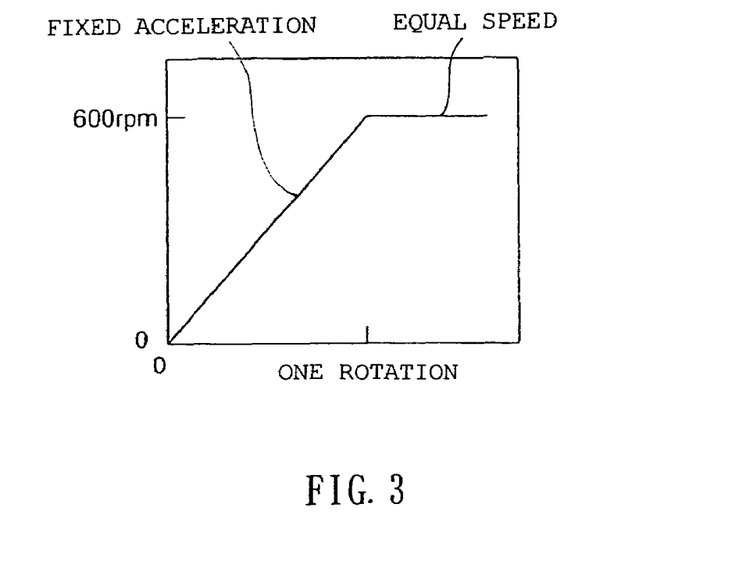
FIG. 3 is a graph showing a relation between rotational quantity and angle speed under the condition that a crankshaft rotates with equal acceleration until 600 rpm per a rotation in starting a cell motor.

As an example, exemplified will be a case that the magnetic encoder 1 is mounted to a crankshaft of an automobile. Here, exemplified will be a case that the angle speed of the crankshaft changes to 600 rpm per a rotation with equal acceleration in starting a cell motor. FIG. 3 is a graph showing a relation between rotational quantity and angle speed of the crankshaft in the above case.

Further, exemplified here will be a case that an arrangement pattern angle of the magnetic poles (corresponding to total width (angle) of the S pole width and the N pole width) is 8.2° for the index 1d, 4.6° for the standard pitch pattern and 2.3° for the fine pitch pattern.

Figure 4:
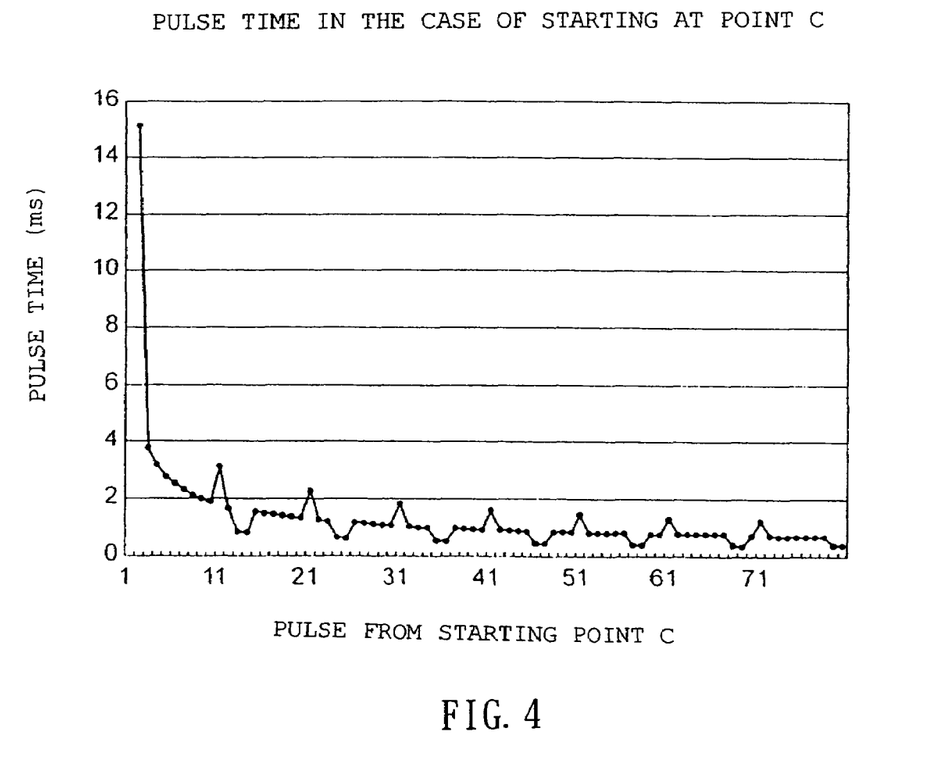
FIG. 4 is a graph showing a change in pulse time when a magnetic encoder of the invention is rotated once from a point C in FIG. 2.
Figure 5:
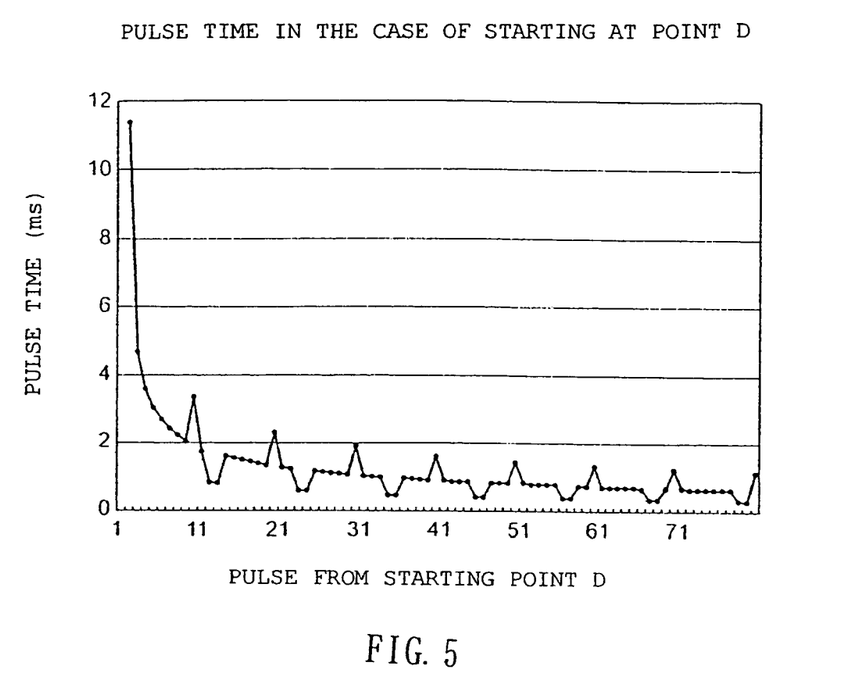
FIG. 5 is a graph showing a change in pulse time when a magnetic encoder of the invention is rotated once from a point D in FIG. 2.
Figure 6:
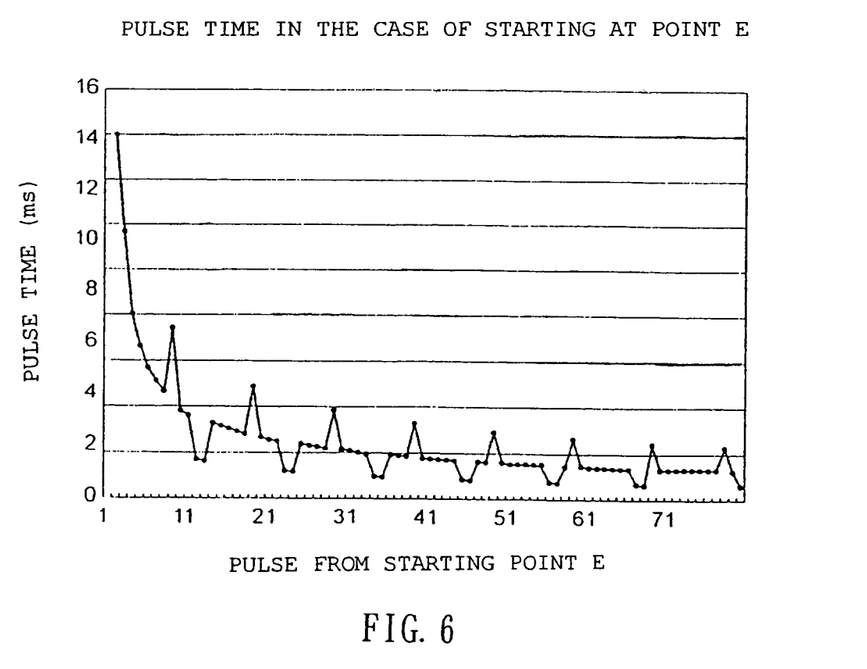
FIG. 6 is a graph showing a change in pulse time when a magnetic encoder of the invention is rotated once from a point E in FIG. 2.

FIGS. 4 to 6 are graphs showing a change in pulse time when the magnetic encoder 1 having the above-mentioned structure is rotated once. In the graphs, the horizontal axis shows detected pulses while the vertical axis shows the pulse width (pulse time). FIGS. 4 to 6 show cases of starting from points C, D and E in FIG. 2, respectively. In any case, a pulse of the index 1d and (two) pulses of the fine pitch pattern 1c are certainly detected within rotation of 90°. Accordingly, it is possible to detect the rotational angle (the absolute position) even in starting time.

In the above description, mentioned is a structure in which changing a position of the fine pitch pattern 1c in the predetermined pattern 1b enables the rotational angle of the predetermined pattern 1b to be specified. It is possible, however, to specify the predetermined pattern 1b when the fine pitch pattern 1c in the predetermined pattern 1b per se is different for every predetermined pattern 1b.

Figure 7:
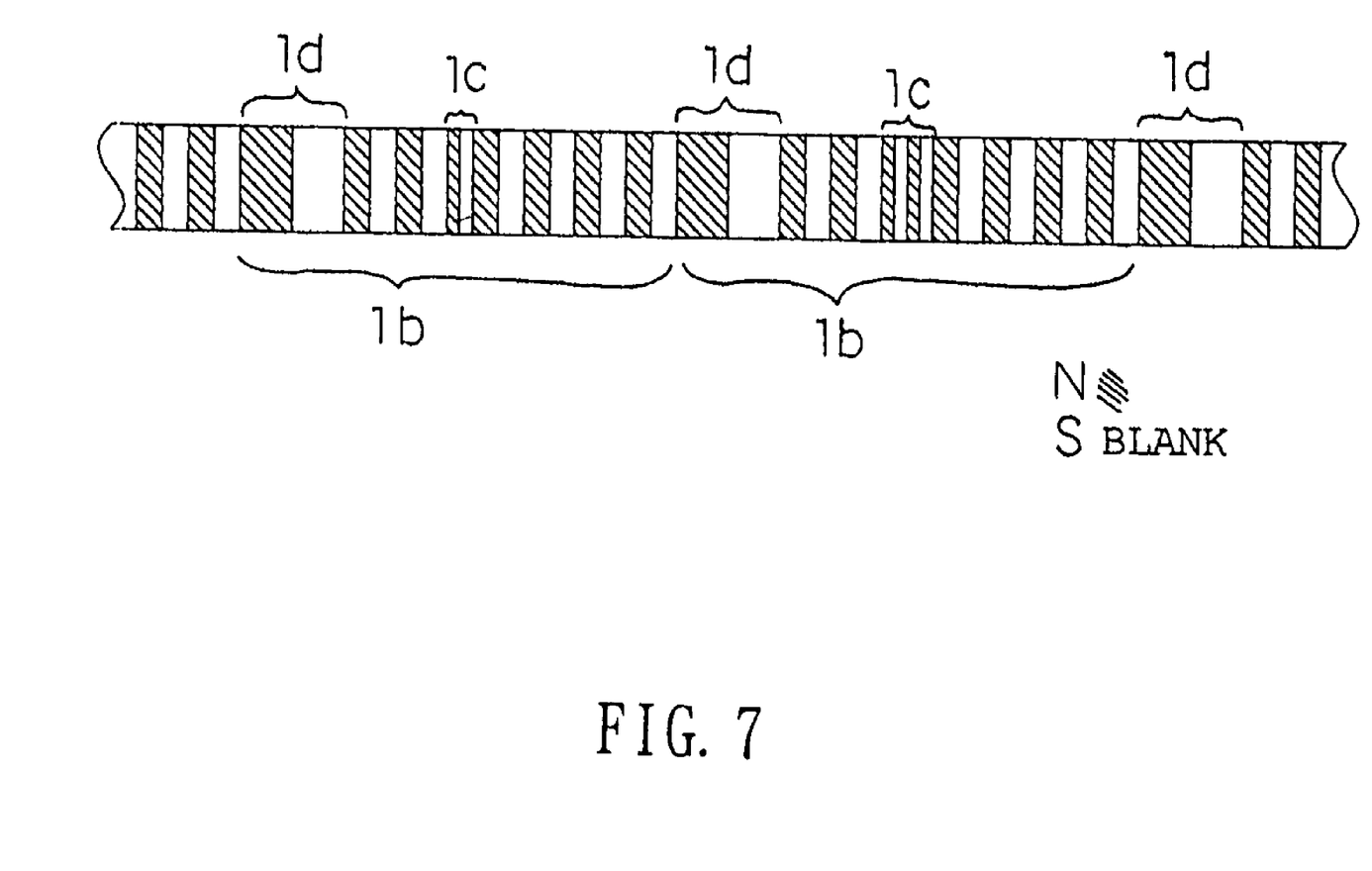
FIG. 7 illustrates a modification of arrangement patterns of magnetic poles of a magnetic encoder of the invention.

For example, changing the number of the magnetic poles, which forms the fine pitch pattern 1c, for every predetermined pattern 1b may also allow the rotational angle of the predetermined pattern 1b to be specified. In more concrete example, the number of the fine pitch pattern 1c in the predetermined pattern 1b on the track 1a is increased at every 45° interval, as shown in FIG. 7. FIG. 7 shows a part of the track 1a. In FIG. 7, the fine pitch pattern 1c shown in the left side of the drawing comprises each one of the N and S poles while the fine pitch pattern 1c shown in the right side of the drawing comprises each two of the N and S poles. In such a structure, specifying the number of the magnetic poles in the fine pitch pattern 1c in one section between two indexes at an output of the track 1a allows the rotational angle of the magnetic encoder 1 to be specified by the angle of 45°.

It may be possible, of course, to provide the fine pitch pattern 1c in each predetermined pattern 1b in a different mode in accordance with combination of an arrangement position and the number of the magnetic pole of the fine pitch pattern 1c. This is effective in the case that the intervals of the predetermined patterns 1b are narrow and larger numbers of predetermined patterns 1b are provided on the whole circumference, for example. In the embodiment, exemplified is a case that the fine pitch patterns are respectively provided in the respective standard pitch patterns other than one standard pitch pattern. It goes without saying, however, that the fine pitch patterns may be provided in different modes for all of the standard pitch patterns. Moreover, exemplified is a case that the index part (the index 1d), the standard pitch part (the standard pitch pattern) and the specific pitch part (the fine pitch pattern 1c) become narrow in width of the magnetic poles in the circumferential direction in the above order. It goes without saying, however, that a relation concerned with a size is not a matter so long as each width is different.

Another magnetic encoder according to another aspect of the invention will be described with reference to FIG. 8.

Exemplified is a case of using the magnetic encoder 1 in a crankshaft of a four-cylinder engine. FIG. 8 illustrates arrangement patterns of magnetic poles of the magnetic encoder of the invention. In FIG. 8, shown are an arrangement pattern of magnetic poles on the track 1a of the magnetic encoder 1 used in a crankshaft and an arrangement pattern of magnetic poles on a track 3a of the magnetic encoder used in a camshaft. The arrangement pattern of magnetic poles on the track 1a of the magnetic encoder 1 used in a crankshaft has the same structure as in the case described above, and therefore, description of the above will be properly omitted.

In a four-cylinder engine, a camshaft rotates 360° when a crankshaft rotates 360°×2 rounds. At rising time of an engine (at starting time of an engine start), the relative positions of the crankshaft and the camshaft are fixed. Accordingly, obtaining a crank angle position allows a position of the cam (a cam angle) to be specified. The crankshaft, however, should be judged whether it is in the first round or in the second round since the camshaft rotates one rounds when the crankshaft rotates two rounds as described above.

Figure 8:
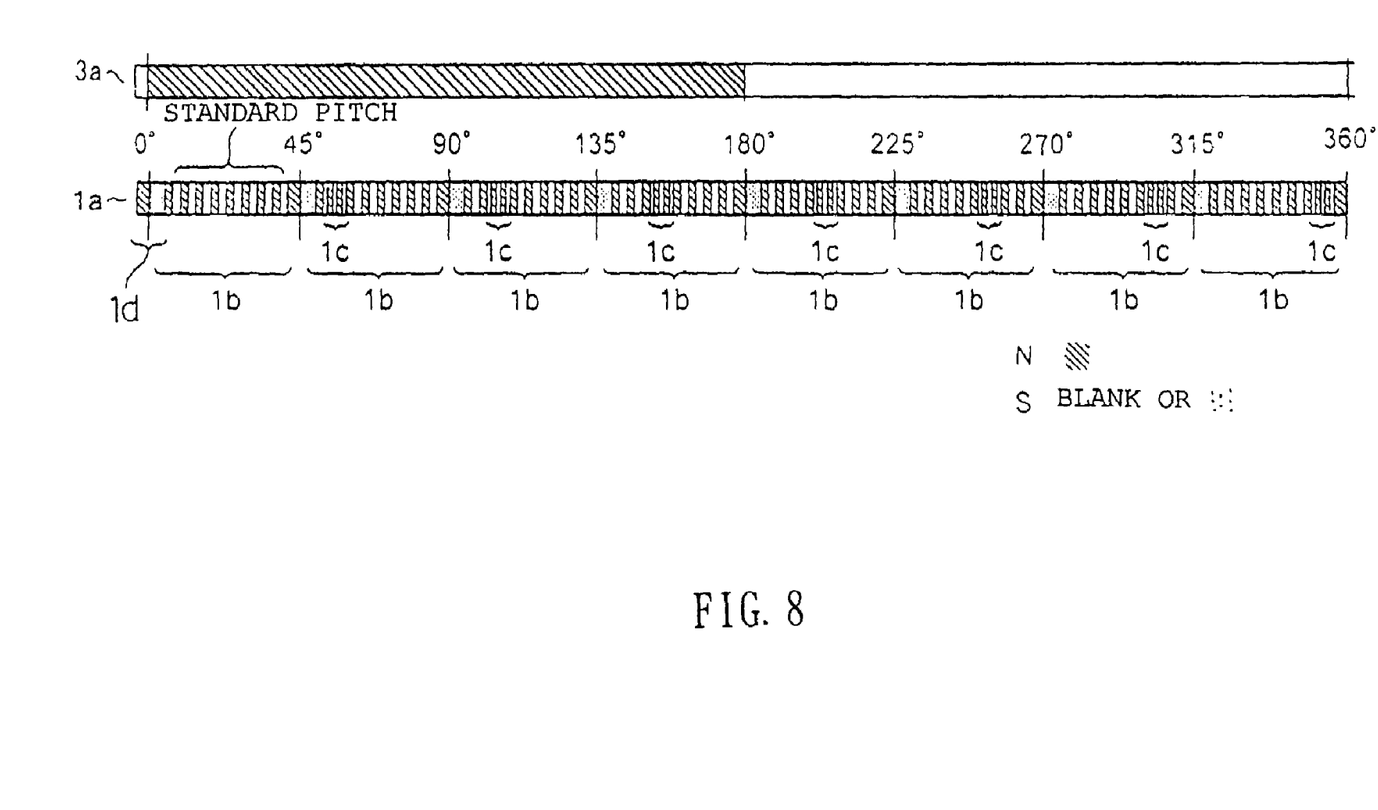
FIG. 8 illustrates arrangement patterns of magnetic poles of a magnetic encoder of the invention.

As a method of the judgment, the magnetic encoder 1 having the track 1a illustrated in FIG. 2 is provided in the crankshaft while a magnetic encoder having the track 3a is provided in the camshaft, as shown in FIG. 8. This allows a cam signal and a cam position signal of the cam to be detected. For the purpose of detecting the signals on the cam side, a component similar to the detecting means 2 of the magnetic encoder 1 may be used. As for the magnetic encoder 1, description is omitted here since it is same as it is described above.

The magnetic encoder mounted to a camshaft is provided on its whole outer circumferential surface with the track 3a shown in FIG. 8. The S poles and the N poles, which are magnetic poles, are provided half and half on the circumference of the track 3a. The arrangement pattern on the track 3a has a cycle of 360°.

0° to 180° (the N pole) and 180° to 360°(the S pole) of the track 3a respectively correspond to 0° to 360° of the track 1a of the magnetic encoder 1 provided in a crankshaft.

Thus, in accordance with the track 3a of 0° to 180° or 180° to 360°, specified is whether the crank is in the first round or the second round. The cam position signal outputs Hi in the N pole from 0° to 180° to detect the first round of the crank and outputs Lo in the S pole from 180° to 360° to detect the second round of the crank in order to judge the number of rotation of the crank.

As described above, rotation of a crankshaft within 90° in a four-cylinder engine allows the crank angle as well as the cam position (the cam angle) to be specified, so that a cylinder position can be obtained. This enables engine control in which unnecessary fuel jet is reduced from the time just after starting an engine to be achieved.

Figure 9:
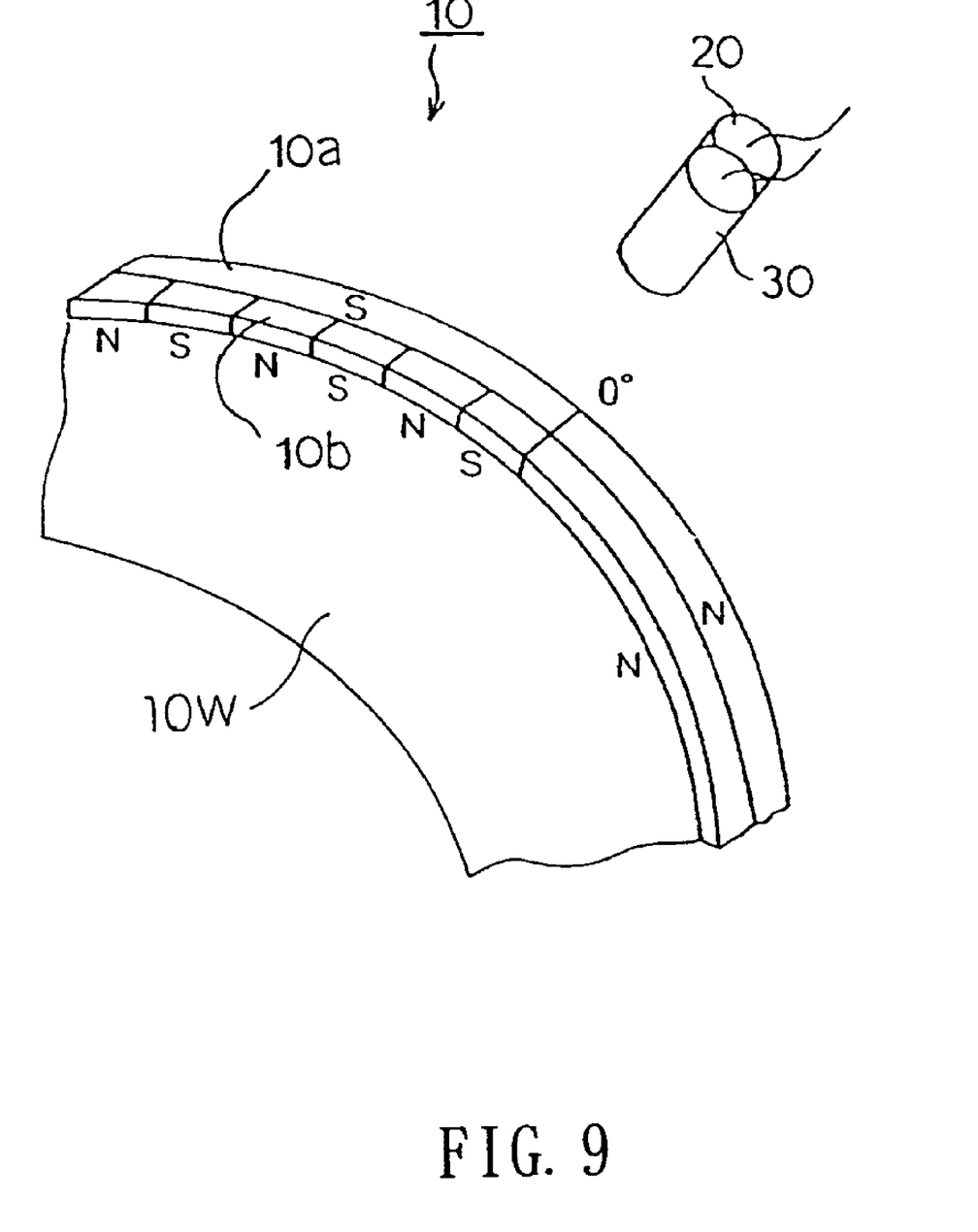
FIG. 9 is a perspective view of a part of a magnetic encoder of the invention.

FIG. 9 is a perspective view of a part of another magnetic encoder of the invention. As shown in FIG. 9, the magnetic encoder 10 comprises a wheel 10w, a first track 10a and a second track 10b provided on the outer circumference of the wheel 10w. Detecting means 20 and 30 for respectively detecting strength of magnetic fields of the first and second tracks 10a and 10b are provided oppositely to the surfaces of the first and second tracks 10a and 10b. The size of the magnetic encoder 10 may be properly selected in accordance with a rotation member to be mounted.

For the detecting means 20 and 30, used are magnetometric sensors. The magnetometric sensor is a sensor for detecting magnetic energy as a subject. A magnetic head to which an electromagnetic induction operation is applied, a differential transformer, a hall element using an operation for converting magnetic power into electricity and an MR element (magnetoresistance effect element) are specific examples of the magnetometric sensor.

The first track 10a and the second track 10b are provided side by side on the outer circumference of the wheel 10w. Both of the first track 10a and the second track 10b have a structure in which the S poles and the N poles, magnetic poles, are alternately provided on the whole circumference. Rotation of the first track 10a and the second track 10b causes a change in polarity of the magnetic poles located at positions opposite to the detecting means 20 and 30 (detecting positions of the detecting means 20 and 30) from N to S or from S to N. The change of the magnetic field is detected as a pulse to calculate the rotational angle and the angle speed of the magnetic encoder 10 on the basis of the number, width or the like of the detected pulse.

The first track 10a has a structure in which plural (four) arrangement patterns respectively having the same arrangement of the magnetic poles are provided. On the other hand, the second track 10b has a structure in which plural (four) arrangement patterns respectively having different arrangement of the magnetic poles are provided. This will be described in more detail hereinafter.

Figure 10:
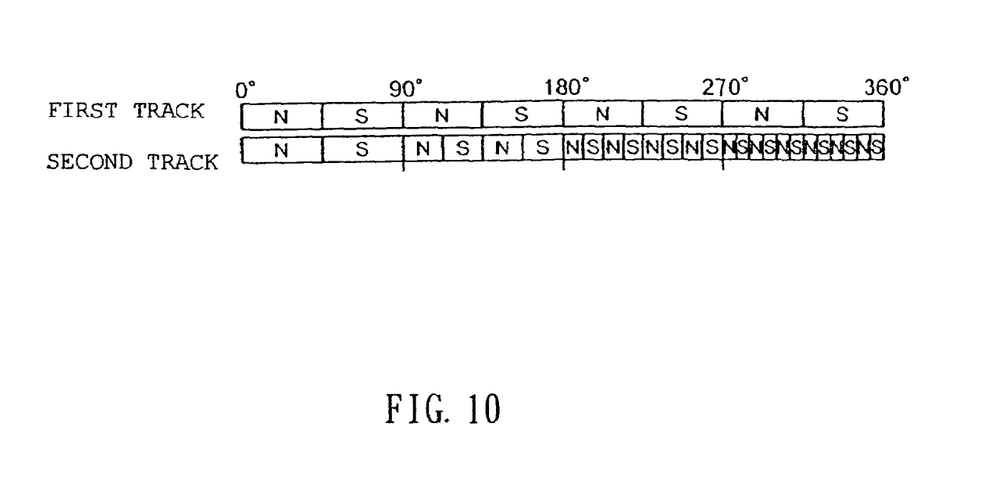
FIG. 10 illustrates arrangement patterns of magnetic poles of a magnetic encoder of the invention.

In the first track 1a, arrangement patterns, each of which has a pair of the N pole and the S pole, are provided in 0° to 90°, 90° to 180°, 180° to 270° and 270° to 360°, respectively, as shown in FIG. 10. The N pole and the S pole of each arrangement pattern are equal in width of the magnetic poles in the circumferential direction. That is to say, the respective magnetic poles have the width of 45°. Accordingly, the first track 1a has a structure in which the N and S poles having the same width in the circumferential direction are alternately provided on the whole circumference.

Such a structure allows rotation of the magnetic encoder 10 by the angle of 45° to be detected on the basis of detection of the magnetic field on the first track 1a. That is to say, the magnetic encoder 10 rotates 45°during a time from detection of a change of the magnetic field in polarity from N to S as a pulse to detection of a change of the magnetic field in polarity from S to N as a pulse (and during a time from detection of a change of the magnetic field in polarity from S to N as a pulse to detection of a change of the magnetic field in polarity from N to S as a pulse).

On the other hand, the second track 1b is for calculating information for specifying positions (0°, 45°, 90°, 135°, 180°, 225°, 270° and 315°), which are obtained by dividing 0° to 360° of the magnetic encoder 1 into eight by the angle of 45°. In the second track 1b, arrangement patterns having different number of magnetic poles are provided in the positions of 0° to 90°, 90° to 180°, 180° to 270° and 270° to 360°, respectively. That is to say, a pair of the N and S poles are provided in 0° to 90°, two pairs of the N and S poles are provided in 90° to 180°, four pairs of the N and S poles are provided in 180° to 270° and six pairs of the N and S poles are provided in 270° to 360°, as shown in FIG. 10.

In other words, in the second track 1b, the number of the magnetic poles in each arrangement pattern adjacent to an arrangement pattern on the first track 1a (a pattern having a pair of the N and S poles) is different in accordance with the rotational angle. Concretely, the number of the magnetic poles increases step by step as the rotational angle becomes large. Thus, the arrangement pattern of the second track 1b is arranged to correspond to the rotational angle in advance.

Figure 11:
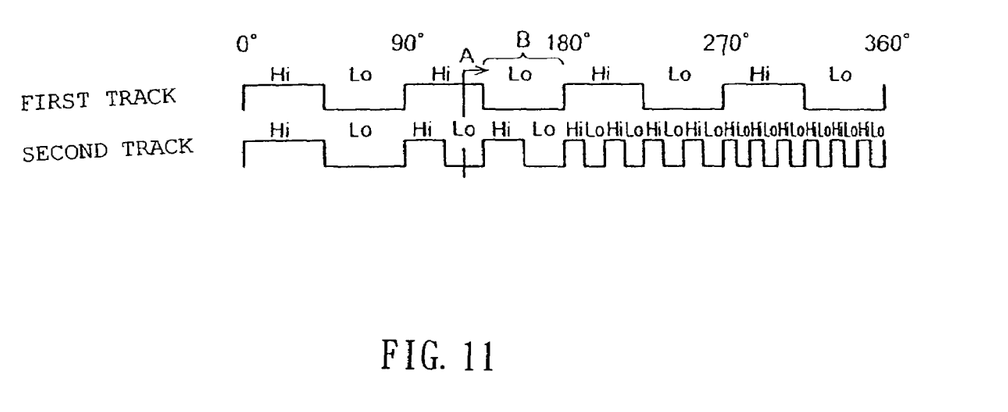
FIG. 11 illustrates output signals of a magnetic encoder of the invention.

FIG. 11 shows output signals from the detecting means 20 and 30. As shown in FIG. 11, the output signal for the first track 10a is in the waveform having a cycle of 90° wherein the N pole is Hi and the S pole is Lo.

On the other hand, the output signal for the second track 10b is in the waveform having cycles different in respective areas of 0° to 90°, 90° to 180°, 180° to 270° and 270° to 360° by the angle of 90°. That is to say, a switch pulse number between Hi and Lo is zero in the area of 0° to 45° and 45° to 90°, one in the area of 90° to 135° and 135° to 180°, three in the area of 180° to 225° and 225° to 270° and five in the area of 270° to 315° and 315° to 360°. The pulses at 0°, 45°, 90°, 135°, 180°, 225°, 270° and 315° are not counted as the switch pulse between Hi and Lo.

In the magnetic encoder 10 having such a structure, a position (0°, 45°, 90°, 135°, 180°, 225°, 270° or 315°) in areas obtained by dividing 0 to 360° by the angle of 45° can be specified within rotation of 90° from any position.

For example, in the case of starting rotation from a point A in FIG. 11, the switch pulse number between Hi and Lo of an output for the second track 10b is one in an area Lo during a time B from obtaining a first pulse with which an output for the first track 10a switches from Hi to Lo to obtaining a subsequent pulse with which the output switches from Lo to Hi. Thus, it can be seen that the position obtaining the pulse switching from Lo to Hi is 180° in the first track 10a.

As described above, the number of pulses switching between Hi and Lo in the second track 10b is counted in a section (corresponding to an angle of 45°), which starts from switching of an output for the first track 10a from Hi to Lo or from Lo to Hi until switching from Lo to Hi or from Hi to Lo. The pulse number contributes to specify the rotational angle of the magnetic encoder 10 at the end of a section of the output for the first track 10a. In this case, the rotational angle of the magnetic encoder 10 necessary for specifying a rotational angle becomes 45° to 90°, which is necessary for measuring switch pulses between Hi and Lo in a section in the first track 10a.

Therefore, in accordance with the magnetic encoder 10 shown in FIG. 10, little rotation allows the rotational angle to be specified. Further, even in the case of reverse rotation of the magnetic encoder 10, the reverse rotation can be discriminated since the order of Hi and Lo in the second track 10b is changed in a section where the pulse switches between Hi and Lo in the first track 10a. This allows the reverse rotation to be stopped with little rotation.

In accordance with the above, there is a following advantage. In the case of a four-cylinder engine, for example, the crankshaft conventionally should have been rotated at the maximum angle of 360° for the purpose of specifying a cylinder position. On the other hand, rotation of the crankshaft within 90° from starting an engine allows the cylinder position to be specified. Accordingly, fuel can be jetted only to a necessary cylinder, and therefore, unnecessary fuel jet can be reduced. This is effective from an environmental point of view.

In addition, the magnetic encoder 10 is effective as a non-contact rotation control means and can be also used for rotation control of an arm of a robot, for example.

Figure 12:
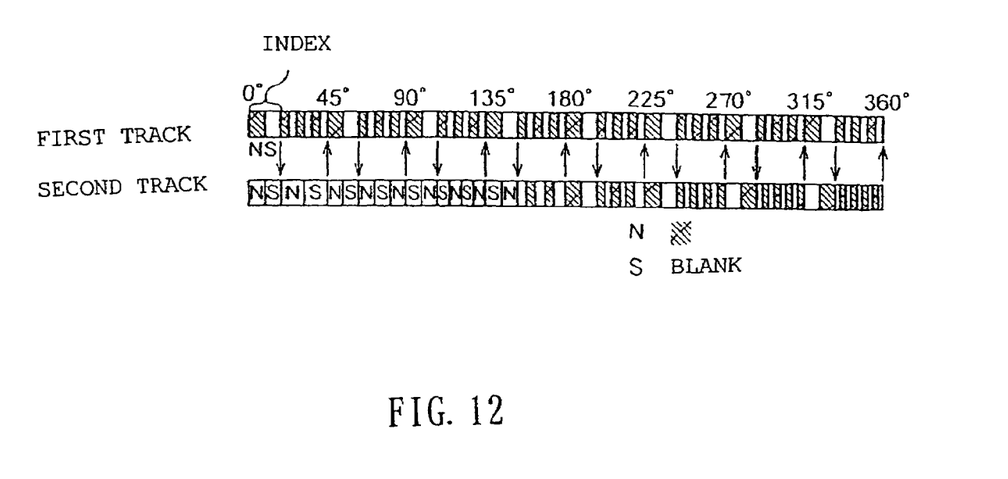
FIG. 12 illustrates arrangement patterns of magnetic poles of a magnetic encoder of the invention.

FIG. 12 illustrates arrangement patterns of magnetic poles of another magnetic encoder of the invention.

Each of the arrangement patterns of the magnetic poles at 45° intervals on the first track has an index (an index part) at the head thereof and a pattern (a standard pitch part) including magnetic poles equal in number, the pattern being formed following the index, and all of the arrangement patterns are same in pattern, as shown in FIG. 12. The width of the magnetic poles in the circumferential direction is different between the index part and the standard pitch part. On the other hand, each of the arrangement patterns of the magnetic poles at 45° intervals on the second track is different in number of the magnetic poles and in arrangement pattern. In Embodiment 3, on the second track, the number of the pair of the N and S poles is different for every arrangement pattern. As illustrated in FIG. 12, however, the number of a single pole is different. That is to say, the number of the magnetic pole on the second track increases one by one so that the number of the magnetic poles would be four in 0° to 45°, five in 45° to 90° and six in 90° to 135°, as the rotational angle increases by 45°. This allows the switch pulse between Hi and Lo to increase one by one for every arrangement pattern as the rotational angle increases. On the second track, however, a pair of magnetic poles having width same as that of the index on the first track are provided in adjacent to the index, followed by magnetic poles having width different for every arrangement pattern for the purpose of reducing interference in magnetic field. A reason why the index is provided in the first track is that switching by the angle of 45° is made clear. In other words, the output pulse for the first track is long in pulse width in the index part and short in pulse width in a part other than the index. Accordingly, a change in pulse width enables switching by the angle of 45° to be detected.

Comparing the output for the first track and the output for the second track also allows the rotational angle to be specified within a range from 45° to 90°, similarly to the case of then encoder shown in FIG. 10. That is to say, the rotational angle is specified on the basis of the switch pulse number between Hi and Lo on the second track during a time from detection of the first index to detection of the subsequent index on the first track. Moreover, in FIG. 10, the magnetic poles are arranged to increase by a pair of the N and S poles for a fixed rotational angle on the second track. In FIG. 12, however, the number of the magnetic poles is arranged to increase by a single pole for a fixed rotational angle. Accordingly, increase in number of the magnetic poles can be reduced even when the rotational angle becomes large in the case of setting the fixed rotational angle small (in the case of increasing the number of the arrangement pattern in a round of circumference). Thus, the width of the magnetic poles can be prevented from being too small, so that deterioration in sensitivity can be kept down.

The invention claimed is:

1. An annular magnetic encoder in which a plurality of S magnetic poles and N magnetic poles are alternately arranged in an arrangement pattern, the arrangement pattern comprising:
   a plurality of index parts provided in a circumferential direction at fixed intervals;
   a plurality of standard pitch parts provided between the index parts; and
   a plurality of specific pitch parts provided in all of the standard pitch parts or in the standard pitch parts other than one standard pitch part, wherein the specific pitch parts are arranged in different positions within each of the standard pitch parts.

2. The magnetic encoder according to claim 1, wherein a position of the specific pitch parts within the standard pitch parts is indicative of a rotational angle.

3. The magnetic encoder according to claim 1, wherein a number of the magnetic poles in the specific pitch part is different from the number of the magnetic poles in each standard pitch part.

* * * * *